(12) United States Patent
Lee

(10) Patent No.: US 11,076,734 B2
(45) Date of Patent: Aug. 3, 2021

(54) ROBOT CLEANER AND CONTROL METHOD THEREOF USING ARTIFICIAL INTELLIGENCE

(71) Applicant: LG ELECTRONICS INC., Seoul (KR)

(72) Inventor: Minho Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 386 days.

(21) Appl. No.: 16/139,194

(22) Filed: Sep. 24, 2018

(65) Prior Publication Data

US 2019/0090711 A1    Mar. 28, 2019

(30) Foreign Application Priority Data

Sep. 26, 2017    (KR) .................... 10-2017-0124513

(51) Int. Cl.
*A47L 9/28* (2006.01)
(52) U.S. Cl.
CPC .......... *A47L 9/2805* (2013.01); *A47L 9/2842* (2013.01); *A47L 9/2852* (2013.01); *A47L 9/2857* (2013.01); *A47L 2201/022* (2013.01); *A47L 2201/04* (2013.01)
(58) Field of Classification Search
CPC .... A47L 9/2805; A47L 9/2842; A47L 9/2852; A47L 9/2857; A47L 2201/022; A47L 2201/04
See application file for complete search history.

(56) References Cited

U.S. PATENT DOCUMENTS

2017/0245718 A1*  8/2017  Son .................. A47L 9/2884

FOREIGN PATENT DOCUMENTS

| JP | 2002-282179 | 10/2002 |
|---|---|---|
| JP | 2013-248065 | 12/2013 |
| KR | 10-2006-0027724 | 3/2006 |
| KR | 10-2006-0066975 | 6/2006 |
| KR | 10-2014-0145328 | 12/2014 |
| KR | 10-2015-0086074 | 7/2015 |

OTHER PUBLICATIONS

Korean Office Action dated Jan. 22, 2019 issued in KR Application No. 10-2017-0124513.

* cited by examiner

*Primary Examiner* — Andrew A Horton
(74) *Attorney, Agent, or Firm* — Ked & Associates, LLP

(57) ABSTRACT

A robot cleaner using artificial intelligence may include a traveling unit configured to move a main body; a cleaning unit configured to perform a cleaning function; a sensing unit configured to sense a surrounding user; and a controller configured to recognize location of a user based on information sensed through the sensing unit, and control to follow the user to perform cleaning. A method of controlling the robot cleaner using artificial intelligence may include recognizing location of a user; and a follow-up cleaning step of following the user to clean a surrounding area of the user.

16 Claims, 13 Drawing Sheets

(a)

(b)

(c)

(d)

(e)

(f)

ROBOT CLEANER AND CONTROL METHOD THEREOF USING ARTIFICIAL INTELLIGENCE

CROSS-REFERENCE TO RELATED APPLICATION(S)

This application claims priority under 35 U.S.C. § 119 to Korean Application No. 10-2017-0124513 filed on Sep. 26, 2017, whose entire disclosure is hereby incorporated by reference.

BACKGROUND

1. Field

The present invention relates to a robot cleaner (or autonomous cleaner) and a control method of the robot cleaner, and more particularly, to a sensing of robot cleaner and a corresponding driving technology.

2. Background

A robot has been developed for industrial use and has played a part in factory automation. In recent years, robot-based fields are further expanded to develop a medical robot, an aerospace robot, and the like, and a household robot that can be used in a general home is also produced. Among these robots, a robot capable of traveling automatically is called a mobile robot. A typical example of a mobile robot used at home is a robot cleaner.

Various technologies for sensing an environment and a user around a robot cleaner through various sensors provided in a robot cleaner are known. In addition, technologies are also known in which a robot cleaner learns and maps a traveling zone by itself and recognizes a current location on the map. A robot which travels and cleans a traveling zone in a preset manner is known.

Korean Laid-Open Patent Application No. 10-2006-0027724 describes a robot cleaner equipped with a mobile terminal and that follows a user when the user makes a call. However, this and other related technology may not clean efficiently.

The cleaning result of the robot cleaner is often unsatisfactory as compared with the cleaning result of a person, so that even if the robot cleaner performs cleaning, a user has to perform cleaning manually. In addition, since the robot cleaner runs a risk of a confinement in the environment of wires, thresholds, etc., the user has to perform cleaning manually. In a surface of a high level such as a desk surface on which the robot cleaner cannot perform cleaning, the user has to perform cleaning manually. However, in the related art, there is a problem that it is impossible for the robot cleaner and the user to organically collaborate with each other.

According to the related art, when a user manually performs cleaning for an area where the robot cleaner is difficult to clean or for a surface of a high level such as a desk surface, there is an inconvenience that the user has to wipe dust and the like manually. In the related art, even if a user puts the dust or the like to be gathered in a specific area where the robot cleaner can perform cleaning, there is a problem that the user should instruct the robot cleaner separately to suck the gathered dust or should wait for a long time until the robot cleaner cleans the specific area.

In the above mentioned related art, there is another problem that it is difficult to select a target to follow when the number of users is two or more. In the above mentioned related art, there is also a problem that it is difficult to change a target to follow when the robot cleaner follows an unintended other user.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
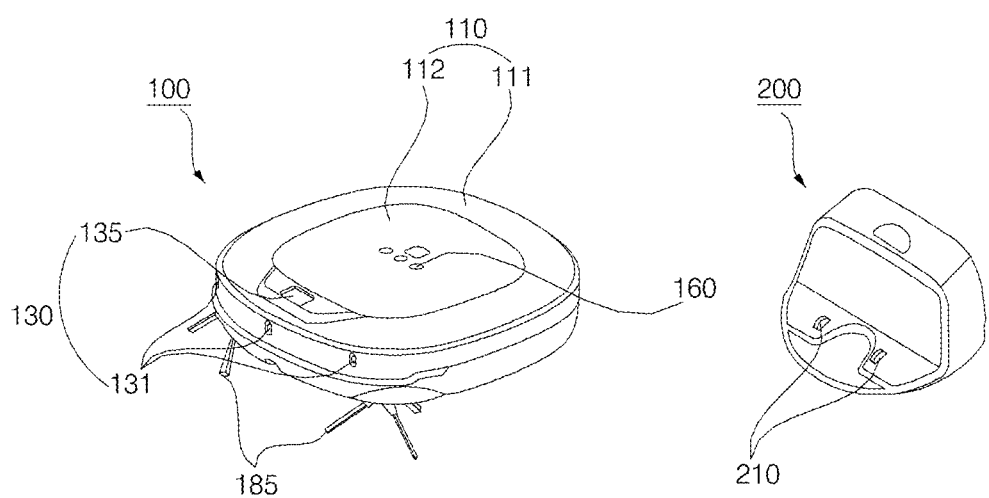
FIG. 1 is a perspective view illustrating a robot cleaner 100 and a charging stand 200 for charging the robot cleaner according to an embodiment of the present invention.
Figure 2:
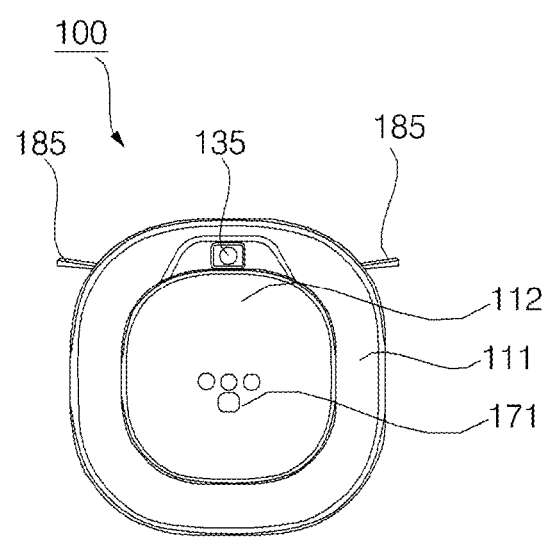
FIG. 2 is an elevation view of the robot cleaner 100 of FIG. 1 viewed from the upper side.
Figure 3:
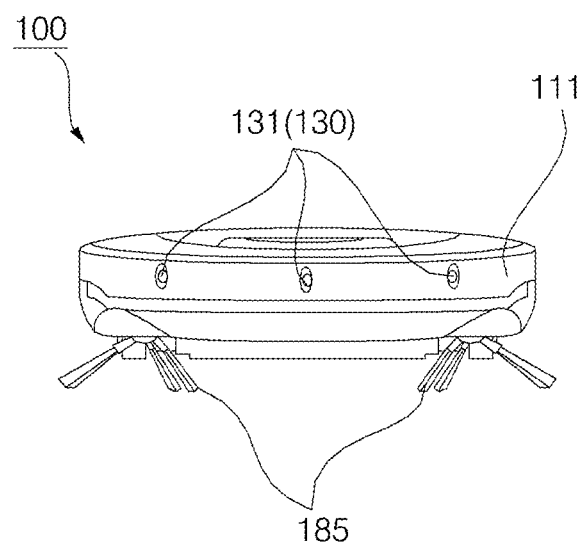
FIG. 3 is an elevation view of the robot cleaner 100 of FIG. 1 viewed from the front.
Figure 4:
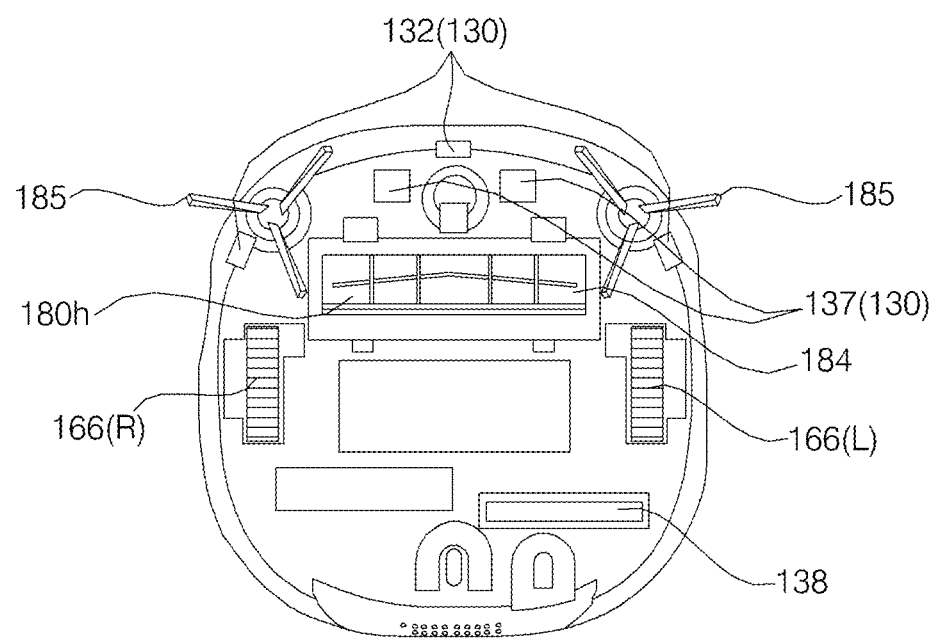
FIG. 4 is an elevation view of the robot cleaner 100 of FIG. 1 viewed from the lower side.
Figure 5:
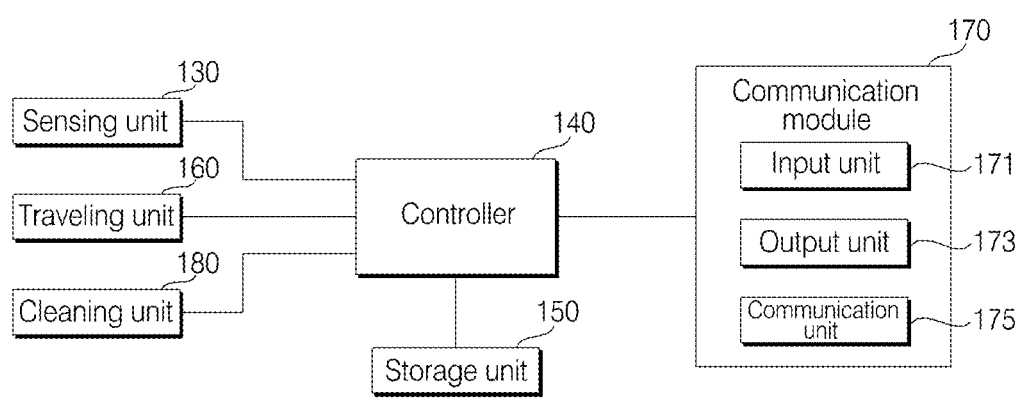
FIG. 5 is a block diagram illustrating a control relationship between main components of the robot cleaner 100 of FIG. 1.

Exemplary embodiments of the present invention are described with reference to the accompanying drawings in detail. Detailed descriptions of well-known functions and structures incorporated herein may be omitted to avoid obscuring the subject matter of the present invention. Also, in the linguistically/mathematically expressed size comparison throughout this document, the terms "less than or equal to (smaller than or equal to)" and "less than (below)" can be readily substituted from the point of view of ordinary expert, the terms "greater than or equal to (more than or equal to)" and "greater than (above)" can be readily substituted from the point of view of ordinary expert, and it is obvious that such a substitution does not incur a problem in exhibiting its effect.

A mobile robot 100, which is the present invention, refers to a robot that can move by itself using wheels or the like, and may be a home helper robot and a robot cleaner. Hereinafter, the robot cleaner 100 will be described as an example of the mobile robot with reference to FIGS. 1 to 5, but the present invention is not limited thereto.

The robot cleaner 100 may include a main body 110. Hereinafter, in defining each part of the main body 110, a portion facing the ceiling in a traveling zone may be defined as a top portion (see FIG. 2), a portion facing the bottom in the traveling zone may be defined as a bottom portion (see FIG. 4), and a portion facing a traveling direction among the portion forming the circumference of the main body 110 between the top portion and the bottom portion may be defined as a front portion (see FIG. 3). Further, a portion of the main body 110 facing the opposite direction to the front portion may be defined as a rear portion. The main body 110 may include a case 111 forming a space in which various components constituting the robot cleaner 100 are accommodated.

The robot cleaner 100 may include a sensing unit 130 for sensing a surrounding situation. The sensing unit 130 may sense information on the external of the robot cleaner 100. The sensing unit 130 may sense a user around the robot cleaner 100. The sensing unit 130 may sense an object around the robot cleaner 100.

The sensing unit 130 may sense information on the traveling zone. The sensing unit 130 may sense obstacles such as wall, furniture, and cliffs on the traveling surface. The sensing unit 130 may sense information on the ceiling. The sensing unit 130 may sense an object placed on the traveling surface and/or an external upper object. The external upper object may include a ceiling disposed on the upper side of the robot cleaner 100, a lower surface of furniture, and the like. The robot cleaner 100 may map the traveling zone through information sensed by the sensing unit 130.

The sensing unit 130 may sense information on a user around the robot cleaner 100. The sensing unit 130 may sense the location information of the user. The location information may include direction information on the robot cleaner 100. The location information may include distance information between the robot cleaner 100 and the user. The sensing unit 130 may sense the direction of the user to the robot cleaner 100. The sensing unit 130 may sense the distance between the user and the robot cleaner 100.

The location information may be obtained immediately by sensing the sensing unit 130, or may be processed and obtained by a controller 140. As an example, distance information may be obtained directly through a camera, an IR sensor, or an ultrasonic sensor. The distance information may be obtained through a distance sensing unit 131. For example, an RGB camera may be used to measure the distance to each point in an image.

As another example, through a sensing by the sensing unit 130, it is possible to map the traveling zone and to sense the user's location information on the map. The distance information may be measured as the distance between any two points on the map. The location of the robot cleaner 100 and the user may be recognized on the map and the distance information between the robot cleaner 100 and the user may be obtained using a coordinate difference on the map.

The location information of the user may be obtained through an image obtained by a camera or the like. The image may be obtained through an image sensing unit 135. The sensing unit 130 may include the image sensing unit 135 for sensing a surrounding image. The image sensing unit 135 may sense an image in a specific direction with respect to the robot cleaner 100. For example, the image sensing unit 135 may sense an image in front of the robot cleaner 100. The image sensing unit 135 may photograph a traveling zone, and may include a digital camera. The digital camera may include at least one optical lens, an image sensor (e.g., a CMOS image sensor) including a plurality of photodiodes (e.g., pixel) that forms an image by a light passing through the optical lens, and a digital signal processor (DSP) for constructing an image based on a signal output from the photodiodes. The digital signal processor can generate a moving image including frames composed of still images, as well as a still image.

The sensing unit 130 may include the distance sensing unit 131 for sensing a distance to a surrounding user. The distance between the robot cleaner 100 and the surrounding user may be sensed through the distance sensing unit 131. The distance sensing unit 131 may sense the distance to the user in a specific direction of the robot cleaner 100. The distance sensing unit 131 may include a camera, an ultrasonic sensor, an infrared (IR) sensor, or the like.

The distance sensing unit 131 may be disposed on the front portion of the main body 110 or may be disposed on a side portion of the main body 110. The distance sensing unit 131 may sense a surrounding obstacle. A plurality of distance sensing units 131 may be provided. The distance sensing unit 131 may be implemented using ultrasonic waves or infrared rays. The distance sensing unit 131 may be implemented using a camera.

The sensing unit 130 may include a cliff sensing unit 132 for sensing a cliff on the floor in the traveling zone. A plurality of cliff sensing units 132 may be provided. The sensing unit 130 may further include a lower image sensor 137 for obtaining an image on the floor.

The robot cleaner 100 may include a traveling unit 160 for moving the main body 110. The traveling unit 160 may move the main body 110 with respect to the floor. The traveling unit 160 may include at least one driving wheel 166 for moving the main body 110. The traveling unit 160 may include a driving motor. The driving wheel 166 may be provided on the left and right sides of the main body 110 respectively (hereinafter, referred to as a left wheel 166 (L) and a right wheel 166 (R), respectively).

The left wheel 166 (L) and the right wheel 166 (R) may be driven by a single drive motor, but, if necessary, may be provided with a left wheel drive motor for driving the left wheel 166 (L) and a right wheel drive motor for driving the right wheel 166 (R). The traveling direction of the main body 110 may be switched to the left or right side with a difference in the rotational speeds of the left wheel 166 (L) and the right wheel 166 (R).

The robot cleaner 100 may include a cleaning unit 180 that performs a cleaning function. The robot cleaner 100 may move the traveling zone and clean the floor by the cleaning unit 180. The cleaning unit 180 may include a suction unit that sucks foreign matter, a brush 184 and 185 that performs brushing, a dust box (not shown) that stores foreign matter collected by the suction unit or the brush, and/or a wiping unit (not shown) that performs a wiping, and the like.

A suction port 180*h* through which air is sucked may be formed in the bottom portion of the main body 110. A suction device (not shown) for supplying a suction force for sucking air through the suction port 180*h* and a dust container (not shown) for collecting the dust sucked together with the air through the suction port 180*h* may be provided in the main body 110.

The case 111 may have an opening for the insertion and removal of the dust container, and a dust container cover 112 for opening and closing the opening may be rotatably provided with respect to the case 111.

A main brush 184 of a roll type having brushes exposed through the suction port 180*h* and an auxiliary brush 185 which is positioned on the front side of the bottom portion of the main body 110 and has a plurality of radially extending feathering may be provided. The dusts may be removed from the floor of the traveling zone by the rotation of the brushes 184 and 185, and the dusts separated from the floor may be sucked through the suction port 180h and collected in the dust container.

A battery 138 may supply the power required for not only the drive motor but also the overall operation of the robot cleaner 100. When the battery 138 is discharged, the robot cleaner 100 may perform a travel to return to a charging stand 200 so as to perform a charging. During the return travel, the robot cleaner 100 may automatically sense the location of the charging stand 200.

The charging stand 200 may include a signal transmitting unit (not shown) for transmitting a certain return signal. The return signal may be an ultrasound signal or an infrared signal, but is not limited thereto.

The robot cleaner 100 may include a communication module (or interface) 170 for getting an information input or receiving information. The communication module 170 may output or transmit information. The communication module 170 may include a communication unit 175 for transmitting/receiving information to/from other external device. The communication module 170 may include an input unit 171 for inputting information. The communication module 170 may include an output unit 173 for outputting information.

For example, the robot cleaner 100 may receive information directly from the input unit 171. As another example, the robot cleaner 100 may receive information input to a separate terminal through the communication unit 175.

For example, the robot cleaner 100 may output information directly to the output unit 173. As another example, the robot cleaner 100 may transmit information to a separate terminal through the communication unit 175, so that the terminal can output information.

The communication unit 175 may be provided to communicate with an external server, a terminal, and/or the charging stand 200. The communication unit 175 may include a signal sensing unit (not shown) for receiving the return signal. The charging stand 200 may transmit an infrared signal through the signal transmission unit, and the signal sensing unit may include an infrared sensor that senses the infrared signal. The robot cleaner 100 may move to the location of the charging stand 200 according to the infrared signal transmitted from the charging stand 200 and dock with the charging stand 200. Such docking may allow to perform a charging between a charging terminal 133 of the robot cleaner 100 and a charging terminal 210 of the charging stand 200.

The communication unit 175 may receive various command signals from the terminal. The communication unit 175 may receive information input from a terminal such as a smart phone or a computer. The communication unit 175 may transmit information to be output to the terminal. The terminal may output information received from the communication unit 175.

The input unit 171 may receive On/Off or various commands. The input unit 171 may include a button, a key, or a touch-type display. The input unit 171 may include a microphone for voice recognition. The output unit 173 may inform a user of various information. The output unit 173 may include a speaker and/or a display.

The robot cleaner 100 may include the controller 140 for processing and determining various information, for example, mapping and/or recognizing current location. The controller 140 may control the overall operation of the robot cleaner 100 through control of various configurations of the robot cleaner 100. The controller 140 may be provided to map the traveling zone through the image and recognize the current location on the map. That is, the controller 140 may perform a simultaneous localization and mapping (SLAM) function.

The controller 140 may receive information from the communication module 170 and process the received information. The controller 140 may receive information from the input unit 171 and process the received information. The controller 140 may receive information from the communication unit 175 and process the received information. The controller 140 may receive information from the sensing unit 130 and process the received information.

The controller 140 may provide information to the communication module 170 so as to output. The controller 140 may provide information to the communication unit 175. The controller 140 may control the output of the output unit 173. The controller 140 may control the driving of the traveling unit 160. The controller 140 may control the operation of the cleaning unit 180.

The robot cleaner 100 may include a storage unit 150 for storing various data. The storage unit 150 may record various information required for controlling the robot cleaner 100, and may include a volatile or nonvolatile recording medium.

The storage unit 150 may store a map of the traveling zone. The map may be inputted by an external terminal capable of exchanging information through the robot cleaner 100 and the communication unit 175, or may be generated by the robot cleaner 100 through automatic learning. In the former case, the external terminal may be a remote controller, a PDA, a laptop, a smart phone, a tablet, or the like in which an application for setting a map is installed.

The actual traveling zone may correspond to the traveling zone on the map. The traveling zone may be defined as a range combining a zone on all plane where the robot cleaner 100 had traveled with a zone on a plane where the robot cleaner 100 is traveling.

The controller 140 may determine the movement path of the robot cleaner 100 based on the operation of the travel unit 160. For example, the controller 140 may determine the current or past traveling speed and the distance traveled by the robot cleaner 100 based on the rotational speed of the driving wheel 166, and also determine the current or past direction change process depending on the direction of rotation of each of the driving wheels 166(L) and 166(R). Based on travel information of the robot cleaner 100, the location of the robot cleaner 100 may be updated on the map. In addition, the location of the robot cleaner 100 may be updated on the map by using the image information.

The controller 140 may recognize the location of the user based on the information sensed through the sensing unit 130. The controller 140 may obtain location information of the surrounding user through the sensing unit 130. The controller 140 may obtain information of distance to the surrounding user through the sensing unit 130.

The controller 140 may control to follow a user to perform cleaning. The controller 140 may control the traveling unit 160 to move the robot cleaner 100 to follow the user. The controller 140 may control the cleaning unit 180 so that the robot cleaner 100 can clean the surrounding area of the user. The controller 140 may control to follow the user and to clean the surrounding area of the user.

The controller 140 may control the movement of the robot cleaner 100 based on the distance sensed by the sensing unit 130. The controller 140 may determine whether to follow the user based on the distance to the user sensed by the distance sensing unit 131. When the distance is relatively large, the controller 140 may determine that the robot cleaner 100 follows the user. When the distance is relatively small, the controller 140 may determine that the robot cleaner 100 follows the user. When the distance is equal to or greater than (or above) a certain value, the controller 140 may control the robot cleaner 100 to follow the user. When the distance is below (equal to or less than) a certain value, the controller 140 may control the robot cleaner 100 to clean the surrounding area of the user.

The robot cleaner 100 may be preset with a plurality of modes which can change the activation. The algorithm for the traveling and/or cleaning of the robot cleaner 100 may be differently set according to each mode. The plurality of modes may include an auxiliary mode. The activation of the auxiliary mode may be selected by a user.

The controller 140 may control the robot cleaner 100 to follow the user and perform cleaning, in the active state of the auxiliary mode. The cleaning of the robot cleaner 100 in the active state of the auxiliary mode may be referred to as 'follow-up cleaning'.

The controller 140 may control the robot cleaner 100 to perform cleaning without following the user, in a state in which the auxiliary mode is inactivated. The cleaning of the robot cleaner 100 in a state in which the auxiliary mode is inactivated may be referred to as 'general cleaning'.

Hereinafter, a control method of the robot cleaner 100 according to embodiments of the present invention will be described with reference to FIGS. 6 to 11. In the flowcharts, the same content is denoted by the same reference numeral, and an overlapped explanation is omitted.

The control method may be performed by the controller 140. The present invention may be a control method of the robot cleaner 100 and may be the robot cleaner 100 including the controller 140 performing the control method. The present invention may be a computer program including each step of the control method, or may be a recording medium on which a program for implementing the control method by a computer is recorded. The 'recording medium' means a computer-readable recording medium. The present invention may be a robot cleaner control system including both hardware and software.

Each step of flowcharts of the control method and the combinations of flowcharts may be performed by computer program instructions. The instructions may be installed in a general purpose computer or a special purpose computer, and the instructions may create means for performing the functions described in the step(s) of flowchart.

In addition, in some embodiments, it is possible that the functions mentioned in the steps may be generated out of sequence. For example, the two steps shown in succession can be performed substantially simultaneously, or, sometimes, the steps can be performed in reverse order according to a corresponding function.

Figure 6:
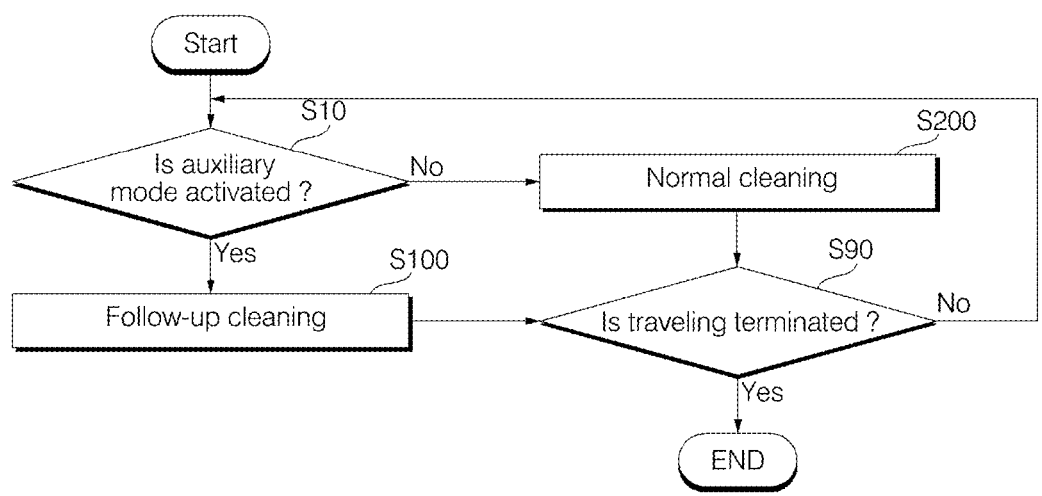
FIG. 6 is a flowchart illustrating a method of controlling a robot cleaner according to an embodiment of the present invention.

Referring to FIG. 6, the control method according to an embodiment may include a step of determining whether the auxiliary mode is activated (S10). The control method may determine whether a certain auxiliary mode is activated (S10), and perform a follow-up cleaning step (S100) only when the auxiliary mode is activated. The control method may perform a general cleaning step (S200) in the inactive state of the auxiliary mode. In the follow-up cleaning step (S100), the robot cleaner 100 may follow the surrounding user to perform cleaning.

In the general cleaning step S200, the robot cleaner 100 may not follow the surrounding user. In the general cleaning step (S200), the robot cleaner 100 may sequentially clean the traveling zone by area. In the general cleaning step (S200), the robot cleaner 100 may clean the entire traveling zone on the map. In the general cleaning step (S200), the robot cleaner 100 may travel in a certain preset pattern regardless of the location of the surrounding user.

The control method may include a traveling termination determination step (S90, S190) for determining whether to terminate the traveling. In the traveling termination determination step, it is possible to determine whether a certain traveling termination condition is satisfied (S90, S190). When the traveling termination condition is satisfied in the traveling termination determination step (S90, S190), the mobile robot 100 may return to the charging stand 210 and may terminate the traveling. The traveling termination condition may include a condition on which a certain time is elapsed, a condition on which a certain operation is completed, and/or a condition on which the charge level of the battery 138 is lowered below a certain value.

Referring to FIG. 6, when the robot cleaner 100 starts traveling, the process of determining whether the auxiliary mode is activated (S10) may be performed. When the activation of the auxiliary mode is changed according to the user's selection, the determination result in step S10 may be changed. When it is determined that the auxiliary mode is in active state in the step S10, the follow-up cleaning step S100 may be performed. When it is determined that the auxiliary mode is in inactive state in the step S10, the general cleaning step S200 may be performed. When the traveling termination condition is satisfied during the follow-up cleaning step S100, the robot cleaner 100 may terminate the traveling. When the traveling termination condition is satisfied during the general cleaning step S200, the robot cleaner 100 may terminate the traveling. When the auxiliary mode is changed to the inactive state during the follow-up cleaning step S100, the general cleaning step S200 may be performed. When the auxiliary mode is changed to the active state during the general cleaning step S200, the follow-up cleaning step S100 may be performed.

Figure 7:
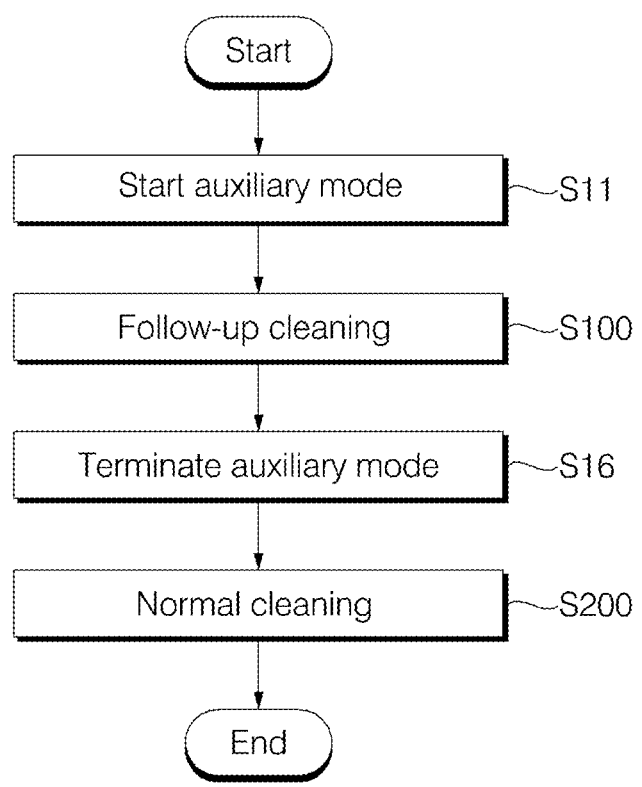
FIG. 7 is a flowchart illustrating a scenario of a process proceeding according to the control method of FIG. 6.

In a scenario shown in FIG. 7, a process (S11) of starting the active state of the auxiliary mode may be performed. When the auxiliary mode is activated, the follow-up cleaning process (S100) may be performed. Then, the auxiliary mode may be changed to the inactive state, and the auxiliary mode may be terminated (S16). The robot cleaner 100 may recognize the location of the user until the auxiliary mode is terminated, and follow the user to perform cleaning. After the auxiliary mode is terminated, the robot cleaner 100 may perform the general cleaning process (S200).

The controller 140 may control to perform a certain motion for displaying the active state of the auxiliary mode. The certain motion may be performed by a preset operation of the traveling unit 160. The certain motion may be preset separately from the operation of following the user to perform cleaning. For example, in the auxiliary mode, the robot cleaner 100 following a user may be compared a pet dog, and the certain motion may be preset to a motion of the main body 110 shaken to the left and right. In the inactive state of the auxiliary mode, the certain motion may be controlled not to be performed. Thus, the user may intuitively check whether the auxiliary mode is activated.

Figure 8:
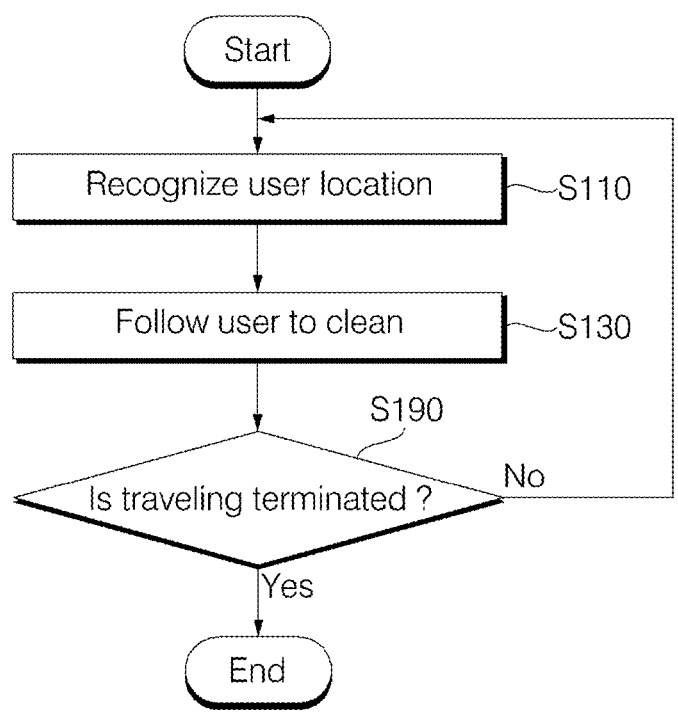
FIG. 8 is a flowchart implementing a follow-up cleaning process S100 of FIG. 6.

Referring to FIG. 8, in the follow-up cleaning step S100, a process (S110) of recognizing the user's location and a process (S130) of following the user to perform cleaning may be performed. The process (S110) and the process (S130) may be performed sequentially or simultaneously. The process (S110) and the process (S130) may be repeatedly performed until the termination of the traveling. For example, after the process (S110) and the process (S130) are performed, the termination determination step (S190) may be performed. When the traveling is not terminated, the process (S110) and the process (S130) may be performed again.

Referring to FIG. 8, in the follow-up cleaning step (S100), the process (S110) of recognizing the location of a surrounding user may be performed. In step S110, the direction of the user around the robot cleaner 100 may be sensed. In step S110, the distance between the robot cleaner 100 and the surrounding user may be sensed.

The controller 140 may recognize the location of the user in real time. The sensing unit 130 may sense the surroundings at a unit time interval or may sense the surroundings continuously in time.

The controller 140 may recognize the surrounding user based on the image photographed by a camera (not shown) mounted in the front of the main body 110. The controller 140 may recognize the user by a Deep Learning method. For example, the Convolutional Neural Network (CNN), which is a type of deep learning, may be utilized. By using the deep learning method, the controller 140 may be preset to find a pattern in the sensed information and to distinguish objects (including user). Base information for the deep learning may include voice information, image information, and the like sensed by the sensing unit 130.

The distance sensing unit 131 may sense the distance to the user in a specific direction of the robot cleaner 100. The specific direction may be the front direction of the robot cleaner 100. For example, the distance sensing unit 131 may include a camera for capturing an image in the specific direction. As another example, the distance sensing unit 131 may include a sensor for transmitting ultrasonic waves or infrared rays in the specific direction.

The controller 140 may recognize the direction of the user and rotate the robot cleaner so that the user may be located in the specific direction, and then control the distance sensing unit 131 to sense the distance to the user. For example, the controller 140 may discriminate a user in an image obtained at a wide range of camera angle and recognize the user's direction with respect to the robot cleaner 100. When the direction of the user is recognized, the controller 140 may rotate the robot cleaner 100 so that the user may be located in the specific direction of the robot cleaner 100. When the user is located in the specific direction of the robot cleaner 100, the distance between the user and the robot cleaner 100 may be sensed through the distance sensing unit 131.

Referring to FIG. 8, in the follow-up cleaning step (S100), the process (S130) in which the robot cleaner 100 follows the user to perform cleaning may be performed. In the follow-up cleaning step S100, the robot cleaner 100 may follow the user to perform cleaning based on the location of the user. In the follow-up cleaning step S100, the robot cleaner 100 may follow the user to perform cleaning based on the sensed distance.

Figure 9:
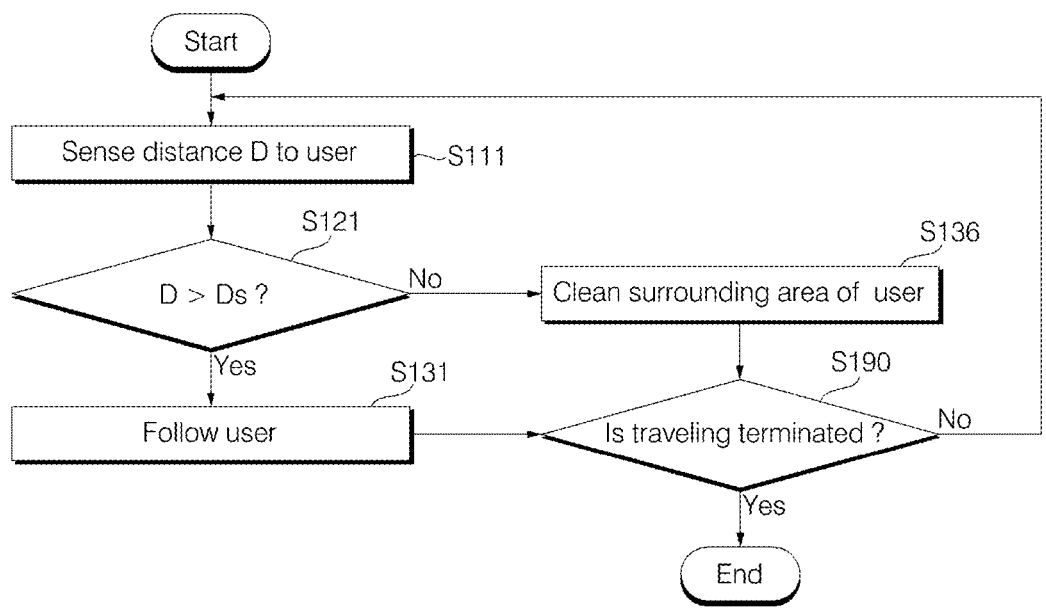
FIG. 9 is a flowchart according to a first embodiment of the follow-up cleaning process S100 of FIG. 6.
Figure 10:
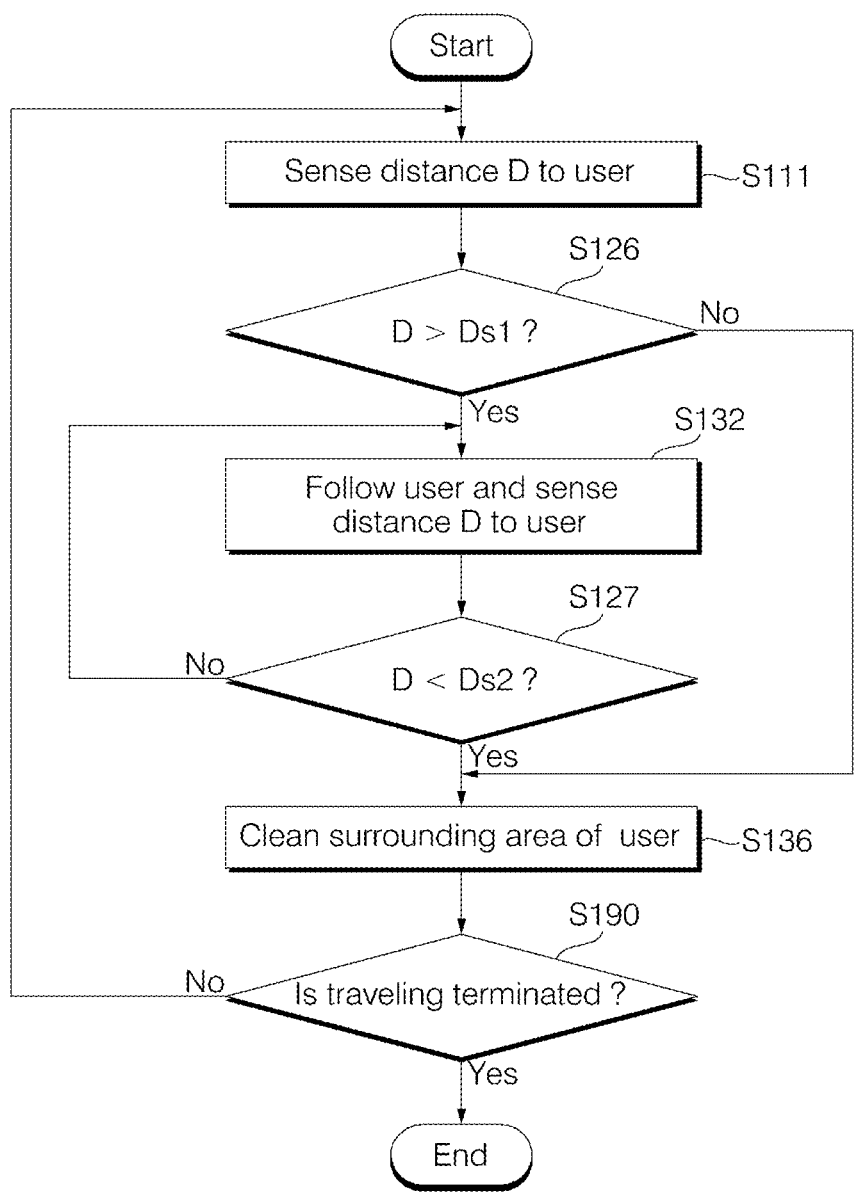
FIG. 10 is a flowchart according to a second embodiment of the follow-up cleaning process S100 of FIG. 6.
Figure 11:
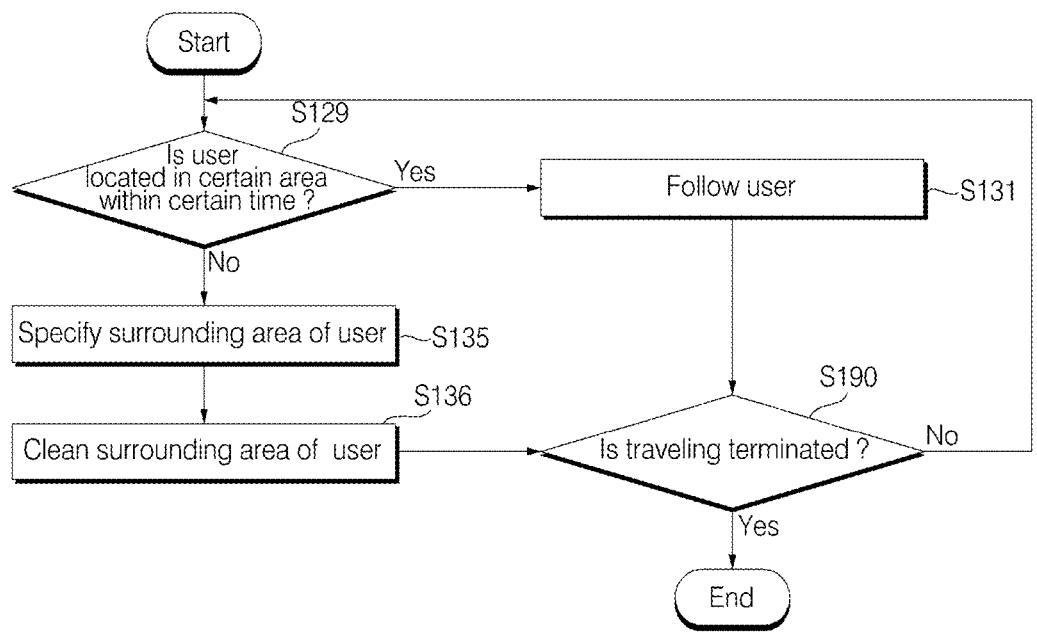
FIG. 11 is a flowchart according to a third embodiment of the follow-up cleaning process S100 of FIG. 6.

Referring to FIGS. 9 to 11, in the follow-up cleaning step (S100), a process (S131, S132) in which the robot cleaner 100 follows the user may be performed. In the follow-up cleaning step (S100), a process (S136) in which the robot cleaner 100 cleans the user's surrounding area may be performed. In the follow-up cleaning step (S100), the robot cleaner 100 may follow the user and clean the surrounding area of the user.

For example, in the above described process (S131, S132), the robot cleaner 100 may move straight toward the user. As another example, in the above described process (S131, S132), the robot cleaner 100 may avoid an obstacle and move to the surrounding area of the user which is a final destination. As another example, in the above described process (S131, S132), the robot cleaner 100 may move in a zigzag manner while performing cleaning and the final destination may be the surrounding area of the user.

Figure 13:
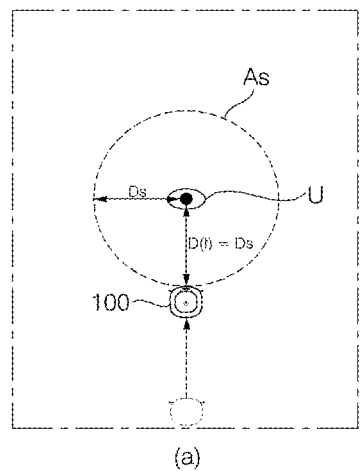
FIG. 13 is a plane conceptual view showing various embodiments in which the surrounding area (As) is specified.
Figure 13:
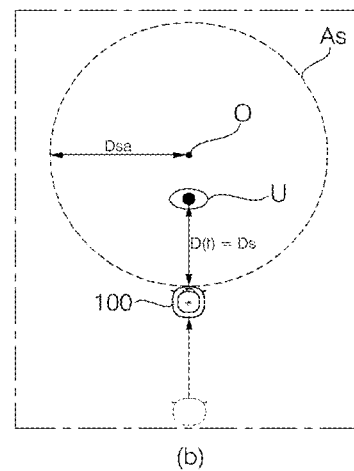
Figure 13:
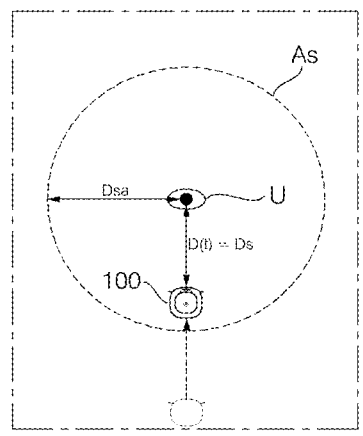
Figure 13:
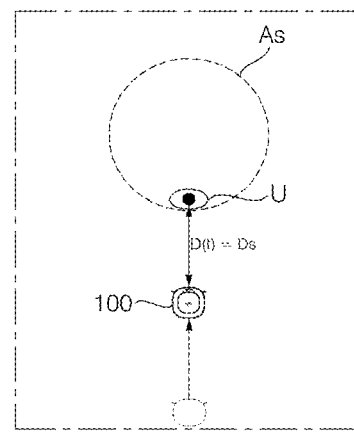
Figure 13:
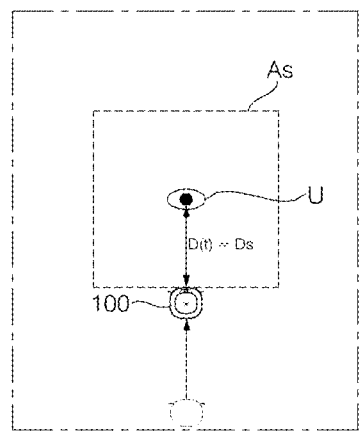
Figure 13:
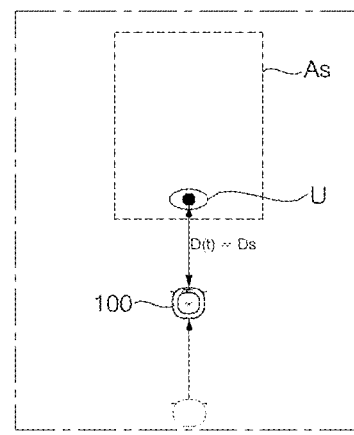

Referring to FIG. 13, various embodiments in which the surrounding area (As) is specified will be described below. It is needless to say that the embodiment in which the surrounding area (As) is specified is not limited to the following, and various combinations and variations are possible.

Referring to sections (a) to (f) of FIG. 13, the surrounding area (As) may be preset to be specified based on the location of the user U at a specific point of time. As an example, a surrounding area (As) around the location of the user U may be specified. As another example, a surrounding area (As) around a location spaced from the location of the user U may be specified.

The specific point of time may be preset to be specified based on a point of time at which a cleaning condition to be described later is satisfied. For example, the specific point of time may be a point of time at which the cleaning condition is satisfied. As another example, the specific point of time may be preset to a point of time before a certain time from a point of time when the cleaning condition is satisfied. As another example, the specific point of time may be preset to a point of time after a certain time from a point of time when the cleaning condition is satisfied.

Referring to sections (a), (b), (d), (e), and (f) of FIG. 13, the surrounding area (As) may be preset to be specified based on the location of the robot cleaner 100 at the specific point of time. Preferably, the surrounding area (As) may be preset to be specified based on the location of the robot cleaner 100 at a point of time when the cleaning condition is satisfied. Referring to sections (a), (b), and (e) of FIG. 13, the surrounding area (As) may be specified in such a manner that the robot cleaner 100 is located on the boundary of the surrounding area (As). Referring to section (d) and (f) of FIG. 13, the shift direction with respect to the location of the user U in the surrounding area (As) may be specified, based on the relative location with respect to the user U of the robot cleaner 100. Referring to FIG. 13, sections (d) and (f), the surrounding area (As) may be shifted to be specified with respect to the user U, in the direction opposite to the location direction of the robot cleaner 100 with respect to the user U.

Referring to FIG. 13, sections (a), (c), and (e), the surrounding area (As) may be specified as a certain area (As) around the location of the user U. Referring to FIG. 13, sections (a) and (c), the surrounding area (As) may be specified as an area (As) within a certain distance around the location of the user U. Referring to FIG. 13, section (a), a distance (Ds) between the user U at the specific point of time and the robot cleaner 100 may be sensed, and the surrounding area (As) may be specified as an area (As) within the distance (Ds) sensed around the location of the user U. Referring to FIG. 13, section (c), the surrounding area (As) may be specified as an area (As) within a specific distance (Dsa) that is larger than the distance (Ds) sensed around the location of the user U. Referring to FIG. 13, section (a), the surrounding area (As) may be specified as an area (As) within a certain value Ds which is described later around the location of the user U. Referring to FIG. 13, section (c), the surrounding area (As) may be specified as an area (As) within a specific distance (Dsa) that is larger than a certain value Ds which is described later around the location of the user U. Referring to FIG. 13 section (e), the surrounding area (As) may be specified as a certain rectangular area (As) based on the location of the user U. Here, the length of one side of the rectangular area may be preset to be two of the certain values (Ds). Here, the length of one side of the rectangular area may be preset to a value longer than the certain value Ds.

Referring to FIG. 13, sections (a), (b), and (e), the surrounding area (As) may be specified in such a manner that the robot cleaner 100 is located on the boundary of the surrounding area (As). Referring to FIG. 13, sections (a) and (e), the surrounding area (As) may be a certain area around the location of the user U and may be specified in such a manner that the robot cleaner 100 is located on the boundary. Referring to FIG. 13, section (b), the surrounding area (As) may be as a certain area around a point (O) different from the location of the user U and may be specified in such a manner that the robot cleaner 100 is located on the boundary.

Referring to FIG. 13, sections (e) and (f), the surrounding area (As) may be specified as a rectangular area around the user U. Referring to FIG. 13, section (e), the surrounding area (As) may be specified as a square area. Referring to FIG. 13, section (f), the surrounding area (As) may be specified as a rectangular area having a long side and a short side. Although not shown, the surrounding area (As) may be specified as other polygon or an ellipse.

Referring to FIG. 13, sections (b), (d), and (f), the surrounding area (As) may be specified as an area shifted to one side based on the location of the user U. The surrounding area (As) may be specified as an area that is shifted toward the front or rear of the user U. The center of the surrounding area (As) may be preset to be specified apart from the location of the user at a specific point of time. FIG. 13, section (b), (d), and (f) show an example in which the surrounding area (As) is shifted toward the front of the user U. The surrounding area (As) may be shifted toward the rear of the user U. Referring to FIG. 13, section (b), (d), and (f), the surrounding area (As) may be specified in such a manner that the center (O) of the surrounding area (As) is located in front of the user U. Referring to FIG. 13, section (b), the surrounding area (As) may be a certain area shifted toward the front or rear of the user U and may be specified in such a manner that the robot cleaner 100 is located on the boundary. Referring to FIG. 13, section (b), the surrounding area (As) may be specified as an area (As) within a specific distance (Dsa) which is larger than the certain value Ds around the location of the user U. Referring to FIG. 13, section (d), the surrounding area (As) may be a certain area shifted toward the front or rear of the user U and may be specified in such a manner that the user U is located on the boundary. Referring to FIG. 13, section (d), the surrounding area (As) may be specified as a front area or a rear area of the user U. Referring to FIG. 13, section (e), the surrounding area (As) may be a certain area shifted toward the front or rear of the user U and may be specified in such a manner that the user U is located outside the surrounding area (As). Referring to FIG. 13, section (b), (d), and (f), the surrounding area (As) may be a certain area shifted toward the front or rear of the user U and may be specified in such a manner that the user U is located within the surrounding area (As).

The robot cleaner 100 may recognize the front or rear of the user U based on sensed information. For example, the front direction in which the face of the user U is located may be recognized based on image information of the sensed user U. For another example, the moving direction of the user U may be sensed to recognize the moving direction of the user as the front. For another example, the follow-up direction (opposite direction) of the robot cleaner with respect to the user U may be recognized as the front.

The manner in which the surrounding area (As) is specified can be changed by the user. A plurality of specific modes in which the surrounding area (As) is specified by different algorithms may be preset. Different specific modes can be selected by the user. In the different specific mode, the manner in which the surrounding area (As) is specified may differ. For example, in a specific mode, the surrounding area (As) may be specified in the manner shown in FIG. 13, section (a), and in another specific mode, the surrounding area (As) may be specified in the manner shown in FIG. 13, section (b).

Referring to FIGS. 9 to 11, in the process (S136) of cleaning the surrounding area of the user, the termination point may be determined according to a certain reference. For example, the process (S136) may be performed until the robot cleaner travels all of the surrounding area of the user and terminates cleaning. As another example, dust may be sensed in step S136, and the process (S136) may be performed until it is determined that dust having a certain value or less is remained based on the sensed dust amount. As another example, the process S136 may be performed for a preset time.

Referring to FIGS. 9 to 11, in the follow-up cleaning process S100, a process (S121, S126, S127, S129) of determining whether the robot cleaner 100 follows the user or cleans the user's surrounding area.

In a first embodiment and a second embodiment of FIG. 9 and FIG. 10, the determining process (S121, S126, S127) may be performed based on the distance to the user. The controller 140 may control the robot cleaner to follow the user when it is determined that the location of the user is relatively far, and may control the robot cleaner to clean the user's surrounding area when it is determined that the location of the user is relatively close.

In a third embodiment of FIG. 11, the determining step (S129) may be performed based on the user's location holding time. The controller 140 may control the robot cleaner to follow the user when it is determined that the user is located in a certain area within a certain time (or for a certain time or less), and may control the robot cleaner to clean the user's surrounding area when it is determined that the user is located in a certain area for a certain time or more (or for more than a certain time).

In the follow-up cleaning step (S100), a process of determining whether a certain follow-up condition is satisfied may be performed (S121, S126, S129). The controller 140 may control the robot cleaner to follow the user when it is determined that the follow-up condition is satisfied. When the follow-up condition is satisfied in the above step (S121, S126, S129), the process (S131, S132) of following the user may be performed. In the first to third embodiments of FIGS. 9 to 11, when the follow-up condition is unsatisfied, the process (S136) of cleaning the surrounding area of the user may be performed.

In the follow-up cleaning step (S100), a process (S127) of determining whether a certain cleaning condition is satisfied may be performed. The cleaning condition may be preset separately from the above follow-up condition. The controller 140 may control the robot cleaner to clean the surrounding area of the user when it is determined that the cleaning condition is satisfied. When the cleaning condition is satisfied in the above process S127, the process (S136) of cleaning the surrounding area of the user may be performed.

In the second embodiment of FIG. 10, when the cleaning condition is unsatisfied, the process (S132) of following the user may be performed.

In the first embodiment and the second embodiment of FIG. 9 and FIG. 10, the follow-up condition may include a distance condition (a first distance condition) in which the distance between the robot cleaner 100 and the user is larger than or equal to a certain value or is larger than a certain value. For example, the controller 140 may determine whether the distance D between the user and the robot cleaner is larger than a certain value (e.g., 10 cm), and may control the robot cleaner to follow the user when the sensed distance D is larger than a certain value. Through the setting of the follow-up condition, when the robot cleaner 100 is moved away from the user by a certain value or more, the robot cleaner 100 may be moved in the user direction. When the location of the recognized user and the location of the robot cleaner 100 are separated from each other by a certain distance or more, the robot cleaner 100 may move to be close to the user who is a follow-up target.

In the third embodiment of FIG. 11, the follow-up condition may include a condition on which the user moves with a certain reference or more (or over a certain reference) within a certain time. The follow-up condition may include a condition on which the user is located in a certain area within a certain time (or for a certain time or less). In the third embodiment, when the follow-up condition is unsatisfied, the user may specify the surrounding area based on the area where the user stayed for a certain time or more (S135). Accordingly, the process of cleaning the surrounding area of the specified user (S136) may be performed.

In the second embodiment of FIG. 10, the cleaning condition may include a distance condition (a second distance condition) in which the distance to the user is within a certain value, or equal to or less than a certain value. For example, the controller 140 may control the robot cleaner to clean the surrounding area of the user when the sensed distance D is smaller than a certain value. Through the setting of the cleaning condition, when the robot cleaner 100 approaches the user within a certain value, the robot cleaner 100 may perform cleaning while moving around the user who is a follow-up target.

In another embodiment, the cleaning condition may include a condition on which the user moves below a certain reference (or in a certain reference or less) for a certain time. The cleaning condition may include a condition on which the user is located in a certain area for a certain time or more (or for more than a certain time). Here, when the cleaning condition is satisfied, the user may specify the surrounding area based on the area where the user stayed for a certain time or more. Accordingly, the process of cleaning the surrounding area of the specified user may be performed.

Hereinafter, each embodiment will be described in detail with reference to FIGS. 9 to 11. Referring to FIG. 9, in the follow-up cleaning process (S100) according to the first embodiment, a process (S111) of sensing the distance D from the robot cleaner 100 to the follow-up target user may be performed. Then, a process (S121) of determining whether the sensed distance D is greater than a certain value Ds may be performed. When it is determined, in the process S121, that the sensed distance D is greater than the certain value Ds, the process (S131) of following the user may be performed. When it is determined, in the process S121, that the sensed distance D is less than or equal to the certain value Ds, the process (S136) of cleaning the surrounding area of the user may be performed. The robot cleaner 100 may follow the user in the process S131 and the distance D to the user may be sensed in real time (S111), and the process S121 may be performed during the follow-up movement of the robot cleaner 100 based on the newly sensed distance D. In addition, when the process S136 is terminated, the distance D to the user may be sensed again (S111), and the process S121 may be performed again based on the newly sensed distance D.

Referring to FIG. 10, in the follow-up cleaning process (S100) according to the second embodiment, a process (S111) of sensing the distance D between the robot cleaner 100 and the follow-up target user may be performed. Then, a process (S126) of determining whether the sensed distance D is greater than the certain value Ds1 may be performed. When it is determined, in the process S126, that the sensed distance D is greater than a certain value Ds1, a process (S132) of following the user may be performed. When it is determined, in the process S126, that the sensed distance D is less than or equal to the certain value Ds1, a process (S136) of cleaning the surrounding area of the user may be performed.

Referring to FIG. 10, in the process S132, it is possible to follow the user and sense the distance D to the user in real time. A process (S127) of determining whether the sensed distance D is less than a certain value Ds2 may be performed, based on the distance D sensed in the process S132. When it is determined, in the process S127, that the sensed distance D is greater than the certain value Ds2, the process (S132) of following the user and sensing the distance D may be continued. The process S127 may be performed during the follow-up movement of the robot cleaner 100, based on the distance D newly sensed in the process S132. When it is determined, in the process S127, that the sensed distance D is less than or equal to the certain value Ds2, the process S132 may be stopped and the process of cleaning the surrounding area of the user may be performed. When the process S136 is terminated, the distance D to the user may be sensed again (S111), and the process S126 may be performed again based on the newly sensed distance D.

Referring to FIG. 11, in the follow-up cleaning process (S100) according to the third embodiment, a process (not shown) of sensing the location of the follow-up target user in real time may be performed. A process (S129) of determining, by the robot cleaner 100, whether the user is located in a certain area within a certain time may be performed, based on sensed location information of the user according to time. When it is determined, in the process S129, that the user is located in a certain area within a certain time, the process (S131) of following the user may be performed. When it is determined, in the process S129, that the user is located in a certain area for a certain time or more, a process (S136) of cleaning the surrounding area of the user may be performed. Before the process (S136) of cleaning the surrounding area, a process (S135) of specifying the surrounding area of the user may be performed. In the process S135, it is possible to specify a certain surrounding area based on the location information of the user sensed for a certain time. The user may follow the user in the process S131 and the location of the user may be sensed in real time, and the process S129 may be performed during the follow-up movement of the robot cleaner 100 based on newly sensed location information of the user. In addition, when the process (S136) is terminated, the location information of the user may be sensed again, and the process of S129 may be performed again based on the newly sensed location information of user.

For example, the certain value (Ds, Ds1, Ds2) may be preset to a specific value ranging from about 1 m to 2 m. The certain value (Ds, Ds1, Ds2) may be implemented in such a manner that the user can change the setting value. For example, the user may change the certain value (Ds, Ds1, Ds2) from any one specific value (e.g., 1 m) to another specific value (e.g., 1.5 m).

The certain value (Ds, Ds1, Ds2) may be changed and set based on sensing information of the sensing unit 130. For example, the certain value (Ds, Ds1, Ds2) may be automatically decreased, when it is determined that the travel zone is clean more than a certain reference based on the sensing information. For example, the certain value (Ds, Ds1, Ds2) may be set to be automatically increased, when it is determined that the user stayed in a certain area for a certain reference time or more based on the sensing information. Obviously, it is not necessary that the setting of the certain value (Ds, Ds1, Ds2) is limited to the above examples.

Meanwhile, a control method when the controller 140 recognizes two or more users is as follows. When sensing two or more users through the sensing unit 130, the controller 140 may control the robot cleaner to follow a user who is determined to be located at the closest distance. The control method may include a process of determining a user located at the closest distance among the two or more users. The sensing unit 130 may sense the distance to each user, and the controller 140 may determine the user located at the closest distance. The robot cleaner 100 may move while following the user located at the closest distance.

Meanwhile, when there are a plurality of users in a traveling space, the robot cleaner 100 may be set to change the follow-up target user when the robot cleaner 100 follows another user unlike the user's intention. If a certain user change signal is received during the follow-up movement toward one of the users, the controller 140 may control to change a follow-up target user. The user change signal may be input through the input unit 171 or may be input through a terminal and received by the communication unit 175. The user change signal may be input through voice, a clapping sound, or the like, and may be input through an IR signal of a remote controller.

For example, when the robot cleaner 100 follows one user, if another user generates a clapping sound, the follow-up target may be changed to the another user. As another example, when a specific button of a remote controller is pressed, the automatic robot cleaner 100 may stop the current follow-up function and may move to the location of the remote controller by a IR sensor signal emitted from the remote controller. After terminating the movement of the robot cleaner 100 by the remote controller, the robot cleaner 100 may follow a person close to the robot cleaner 100, so that the follow-up target may be changed to a user who operated the remote controller.

Meanwhile, the robot cleaner 100 may accomplish an intensive cleaning function even when the auxiliary mode is activated. The controller 140 may control to follow the user after cleaning a specific area, when receiving a certain intensive cleaning signal. The specific area may be specified by the intensive cleaning signal. The intensive cleaning signal may be input through the input unit 171 or may be input through a terminal and received by the communication unit 175. The intensive cleaning signal may be input through voice, clapping sound, or the like, and may also be input through a IR signal of the remote controller.

For example, when the robot cleaner 100 receives the intensive cleaning signal during the cleaning while following the follow-up target user, the robot cleaner 100 may be set to stop the follow-up cleaning and clean the specific area. Here, after the intensive cleaning of the specific area is terminated, the robot cleaner may be set to perform cleaning while following a surrounding user again.

Figure 12:
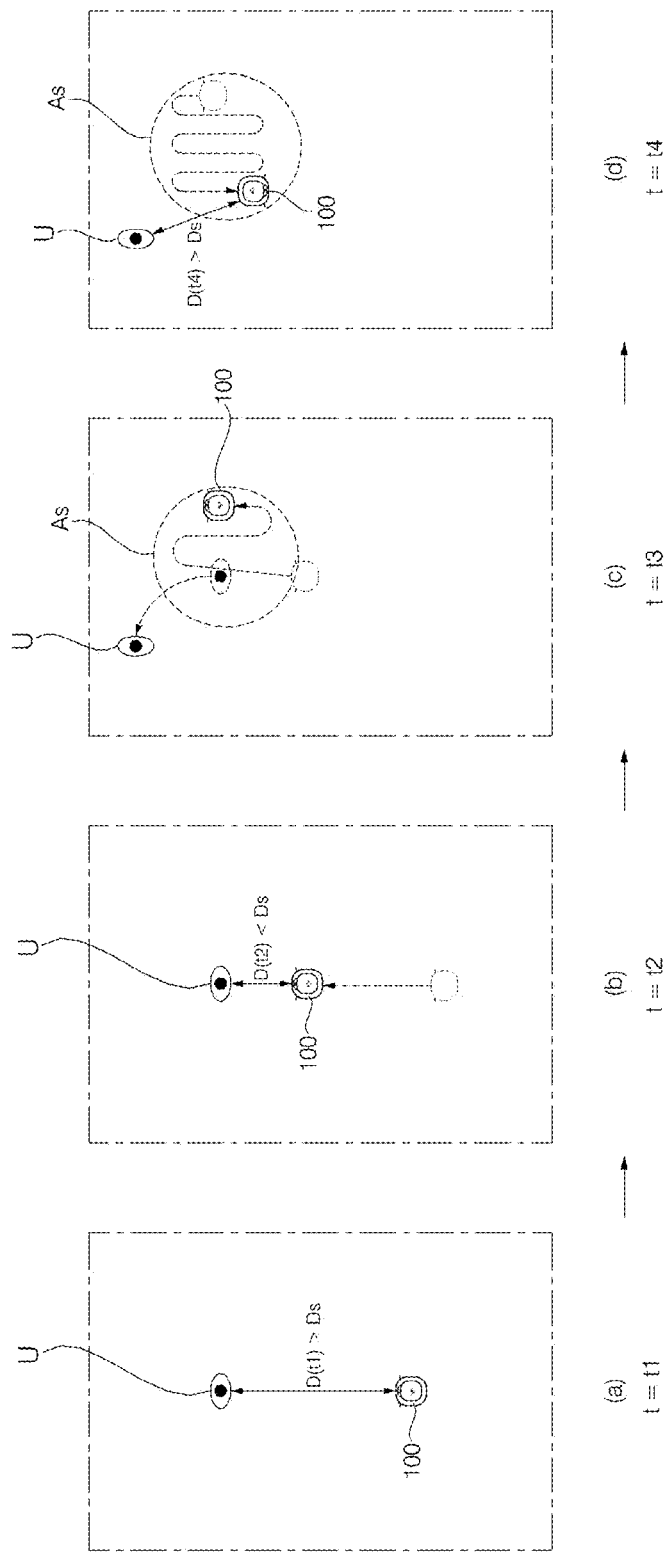
FIG. 12 is a plane conceptual view showing a scenario in which the robot cleaner 100 moves to follow a user (U) and cleans a surrounding area (As)

Hereinafter, a scenario of FIG. 12 will be described. FIG. 12, sections (a), (b), (c) and (d) show the situation at each time point (t=t1, t2, t3 and t4) according to a sequential time flow. In FIG. 12, D(t1), 12D(t2), and 12D(t4) are respective distances between the user U and the robot cleaner 100 sensed at each time point (t=t1, t2 and t4).

Referring to FIG. 12, section (a), the robot cleaner 100 may move and sense the distance to the user U. It is determined that the sensed distance D(t1) is larger than the certain value Ds, and the robot cleaner 100 may follow the user U. Referring to FIG. 12, section (b), the robot cleaner 100 may continuously sense the distance D(t) to the user U while moving toward the user. It is determined that the newly sensed distance D(t) is smaller than the certain value Ds, and the robot cleaner 100 specifies the surrounding area (As) of the user U. Referring to FIG. 12, section (c), the robot cleaner 100 may clean the surrounding area (As) of the user U. Referring to FIG. 12, section (d), the robot cleaner 100 may sense the distance to the user U, after terminating the cleaning of the surrounding area (As). At this time, the user has already moved the location. It is determined that the newly sensed distance D(t4) is greater than the certain value Ds, and the robot cleaner 100 may move toward the new location of the user U.

Through the above-mentioned solution, there is an effect that the user and the robot cleaner can conveniently and efficiently cooperate with each other to perform cleaning. Specifically, cooperative cleaning can be achieved in such a manner that user performs manually cleaning of a dust of an obstacle such as electric wire, threshold, etc. that may confine the robot cleaner while the robot cleaner sucks the dust.

The robot cleaner can follow the user and perform cleaning, so that the robot cleaner can remove the dust, or the like that has been automatically gathered in a specific area in a relatively short time like a dust pan, when the user gathers the dust or the like in a specific area where the robot cleaner can perform cleaning. For example, when a user shake the dust off a blanket or the like or gathers the dust or the like on a desk toward the floor where the cleaner is located, the robot cleaner can follow the user and suck the dust.

Further, since the robot cleaner follows the user while performing cleaning, if the robot cleaner is confined to a threshold, a wire, or the like, it is convenient for the user to immediately release the confinement of the robot cleaner. Further, since the robot cleaner cleans the user's surrounding area, even if the user shake the dust off easily to the surrounding area while performing cleaning, the robot cleaner can clean the dust.

In addition, by controlling the follow-up movement and the surrounding area cleaning based on the distance, the robot cleaner can follow the user while maintaining a certain distance level. In addition, the activation of the auxiliary mode can be changed, so that the user can determine, depending on the situation, to allow the robot cleaner to support the user to perform cleaning or to allow the robot cleaner to perform cleaning independently.

By pre-setting the certain motion, the activation of the auxiliary mode can be intuitively checked. In addition, when two or more users are sensed, the user who is determined to be located at the closest distance may be followed, or the user may be changed when a user change signal is inputted. Thus, even in a traveling space where a plurality of users exist, the robot cleaner can be moved to follow the user as intended by the user. In addition, through the intensive cleaning signal, the robot cleaner can clean an uncleaned area which may occur when the robot cleaner follows the user to perform cleaning.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

An embodiment may be achieved in a whole or in parts by a robot cleaner that may include: a traveling unit configured to move a main body; a cleaning unit configured to perform a cleaning function; a sensing unit configured to sense a surrounding user; and a controller configured to recognize location of a user based on information sensed through the sensing unit, and control to follow the user to perform cleaning.

The controller controls the robot to follow the user to clean a surrounding area of the user. The controller controls the robot to follow the user when the location of the user is relatively far, and controls to clean the surrounding area of the user when the location of the user is relatively close. The controller controls the robot to follow the user when it is determined that a certain follow-up condition is satisfied.

The sensing unit includes a distance sensing unit which senses a distance to the user. The certain follow-up condition includes a distance condition on which a distance to the user is above a certain value, or is equal to or greater than the certain value.

The controller controls the robot to clean the surrounding area of the user, when it is determined that a certain cleaning condition is satisfied. The sensing unit comprises a distance sensing unit which senses a distance to the user. The cleaning condition includes a distance condition on which a distance to the user is below a certain value, or is equal to or less than the certain value.

The controller determines whether to follow the user based on a distance sensed by the distance sensing unit. The controller may control to follow the user when the sensed distance is greater than a certain value. The control unit may control to clean a surrounding area of the user when the sensed distance is less than a certain value.

The distance sensing unit senses a distance to the user in a specific direction of the robot cleaner. The controller controls the robot to recognize a direction of the user and rotate the robot cleaner so that the user is located in the specific direction, and then controls the distance sensing unit to sense the distance to the user.

The controller controls the robot to follow the user to perform cleaning in an active state of an auxiliary mode in which activation is able to be selected. The controller controls the robot to perform a certain motion for displaying the active state of the auxiliary mode. The certain motion is preset separately from an operation of following the user to perform cleaning.

The sensing unit senses a distance to the user. The controller controls the robot to follow a user determined to be located at the closest distance, when two or more users are sensed through the sensing unit. The controller controls the robot to change a follow-up target user, when a certain user change signal is inputted during a follow-up movement of a certain single user. The controller controls the robot to follow the user after cleaning a specific area, when a certain intensive cleaning signal is input.

An embodiment may be achieved in a whole or in parts by a method of controlling a robot cleaner, and the method may include: recognizing location of a user; and a follow-up cleaning step of following the user to clean a surrounding area of the user.

The follow-up cleaning step determines whether a certain follow-up condition is satisfied, and follows the user when the follow-up condition is satisfied. The follow-up cleaning step comprises cleaning the surrounding area of the user when the follow-up condition is not satisfied. The follow-up cleaning step is performed only in an active state of an auxiliary mode, by determining whether a certain auxiliary mode is activated.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An autonomous cleaner comprising:
   a motor that is selectively driven to move the autonomous cleaner;
   a cleaning head that performs cleaning;
   a sensor that detects information about a region in which the autonomous cleaner is travelling; and
   a controller that:
      determines a location of a user based on the information detected by the sensor, and
      manages the motor based on the location the user such that the autonomous cleaner moves to follow the user and to perform cleaning.

2. The autonomous cleaner of claim 1, wherein the controller further manages the motor such that the autonomous cleaner moves to clean a surrounding area of the user.

3. The autonomous cleaner of claim 2, wherein the controller manages the motor such that the autonomous cleaner moves to:
   follow the user when the distance between the location of the user and the autonomous cleaner is at least a threshold distance, and
   clean the surrounding area of the user when the distance between the location of the user and the autonomous cleaner is less than the threshold distance.

4. The autonomous cleaner of claim 2, wherein the controller manages the motor such that the autonomous cleaner moves to follow the user when the controller determines that a follow-up condition is satisfied, and
   wherein the follow-up condition is satisfied when a distance between the autonomous cleaner and the location of the user is equal to or greater than a threshold value.

5. The autonomous cleaner of claim 2, wherein the controller manages the motor such that the autonomous cleaner moves to clean the surrounding area of the user when the controller determines that a cleaning condition is satisfied,
   wherein the cleaning condition is satisfied when a distance between the autonomous cleaner and the location of the user is below a threshold value.

6. The autonomous cleaner of claim 5, wherein the controller identifies the surrounding area to be cleaned based on a location of the autonomous cleaner when the cleaning condition is satisfied.

7. The autonomous cleaner of claim 6, wherein the controller identifies the surrounding area based on the location of the user when the cleaning condition is satisfied.

8. The autonomous cleaner of claim 2, wherein the surrounding area is positioned at one side of the location of user.

9. The autonomous cleaner of claim 1, wherein the controller is further configured to:
   generate a map of the region in which the autonomous cleaner is travelling based on the information detected by the sensor;
   determine respective coordinates for the user and the autonomous cleaner in the map; and
   determine a movement path based on the map and the respective coordinates for the user and the autonomous cleaner.

10. The autonomous cleaner of claim 1, wherein the sensor, when determining the location of the user, emits at least one of ultrasonic waves or infrared rays, and detects a reflection of the at least one of the ultrasonic waves or the infrared rays from the user;
    the controller determines a distance between the user and the autonomous cleaner based on an attribute of the reflection.

11. The autonomous cleaner of claim 1, wherein the sensor detects a distance to the user from the autonomous cleaner, and
    wherein the controller determines whether to follow the user based on the distance to the user from the autonomous cleaner.

12. The autonomous cleaner of claim 11, wherein the sensor detects distances along in a particular sensing direction relative to the autonomous cleaner, and
    wherein the controller manages the motor to rotate the autonomous cleaner so that the location of the user is positioned along the specific sensing direction relative to the autonomous cleaner, and manages the sensor to sense the distance to the user along the particular sensing direction.

13. The autonomous cleaner of claim 1, wherein the controller manages the motor such that the autonomous cleaner moves to follow the user to perform cleaning when a particular mode is activated, and further manages the motor such that the autonomous cleaner performs a prescribed motion to indicate that the particular mode is activated, and
    wherein the prescribe motion to indicate that the particular mode is activated is separate from motions related to following the user to perform cleaning.

14. The autonomous cleaner of claim 1, wherein the sensor detects respective distances between the autonomous cleaner and two or more users, and
    wherein the controller manages the motor such that the autonomous cleaner moves to follow a closest one of the two or more users.

15. The autonomous cleaner of claim 1, wherein the controller further determines when a user change signal is received while the autonomous cleaner is following the user, and when the user change signal is received, the controller further:
- determines a location of another user based on information detected by the sensor, and
- manages the motor based on the location the other user such that the autonomous cleaner moves to follow the other user and to perform cleaning.

16. The autonomous cleaner of claim 1, wherein the controller manages the motor such that the autonomous cleaner moves to follow the user after cleaning a particular area when a particular input is received.

* * * * *